United States Patent
Naperola et al.

(10) Patent No.: US 6,202,640 B1
(45) Date of Patent: Mar. 20, 2001

(54) GRILL LIGHTING APPARATUS

(76) Inventors: James B. Naperola, 717 E. Fairplains, Greenville, MI (US) 48838; Brian Shotko, 6194 Long Lake Rd., Belding, MI (US) 48809

( * ) Notice: Subject to any disclaimer, the term of this patent is extended or adjusted under 35 U.S.C. 154(b) by 0 days.

(21) Appl. No.: 09/532,471

(22) Filed: Mar. 22, 2000

(51) Int. Cl.[7] .............................. F21V 37/00; A47J 37/07
(52) U.S. Cl. ........................ 126/41 R; 126/213; 362/93
(58) Field of Search ........................ 126/41 R, 25 R, 126/92 AC, 92 R, 92 B, 213, 258; 431/110, 344; 362/92, 93, 179, 266, 427

(56) References Cited

U.S. PATENT DOCUMENTS

| | | |
|---|---|---|
| D. 412,591 | 8/1999 | Murch . |
| 583,547 | * 6/1897 | Prendergast et al. ............... 431/110 |
| 1,042,750 | * 10/1912 | Bader ................................. 431/344 |
| 3,140,740 | * 7/1964 | Lagreid et al. .................... 431/110 |
| 3,210,537 | * 10/1965 | Groves .............................. 126/258 |
| 3,251,356 | * 5/1966 | Prince et al. ..................... 126/92 B |
| 3,524,980 | * 8/1970 | Meloan ............................. 126/41 R |
| 3,883,288 | 5/1975 | Berlincourt et al. . |
| 3,992,618 | 11/1976 | Matthews et al. . |
| 4,025,288 | 5/1977 | Plozner . |
| 4,338,075 | 7/1982 | Bemm . |
| 5,257,169 | 10/1993 | Walendziak . |
| 5,664,875 | 9/1997 | Hegedus . |

* cited by examiner

Primary Examiner—Ira S. Lazarus
Assistant Examiner—Sara Clarke
(74) Attorney, Agent, or Firm—Dale J. Ream

(57) ABSTRACT

A grill lighting apparatus comprising a hollow conduit adapted to be mounted to a hollow frame member of a gas grill. A first end of the conduit has a circumference smaller than that of the hollow frame member such that the first end may be mounted in a sliding fit relationship within the frame member. The conduit extends upwardly and includes a second end displaced from the first end and positioned over a cooking grate of the grill. An illumination assembly is pivotally mounted to the second end of the conduit. A flexible tube or hose extends through the interior space of the conduit and is adapted to carry a combustible fuel, such as propane, from a fuel tank of the gas grill to the illumination assembly. The illumination assembly includes a mantle which is effective to provide light when the fuel delivered thereto is ignited under controlled conditions.

18 Claims, 5 Drawing Sheets

GRILL LIGHTING APPARATUS

BACKGROUND OF THE INVENTION

This invention relates generally to outdoor lighting devices and, more particularly, to a gas powered barbecue grill lighting apparatus.

The use of outdoor cooking grills has become very popular and such grills are often used for cooking an evening meal. The use of outdoor grills during the evening often results in an inadequate amount of ambient light being available to discern when the meat has been completely cooked. Various devices have been proposed in the prior art for lighting a grill, such as those disclosed in U.S. Pat. Nos. 3,992,618 to Matthews, U.S. Pat. No. 5,257,169 to Walendziak, and U.S. Pat. No. 5,664,875 to Hegedus. Although assumably effective for their particular purposes, they are not as suitable for use with new or existing outdoor gas grills as the invention disclosed herein.

Therefore, it is desirable to have a grill lighting device that is easily installed on new or existing gas grills. It is further desirable to have an apparatus which can be powered by the same combustible fuel that operates the gas grill. Finally, it is desirable to have a lighting apparatus which is pivotal so as to selectably light the grill cooking grate or an area adjacent to the grill.

SUMMARY OF THE INVENTION

A grill lighting apparatus according to a preferred embodiment of the present invention includes a hollow conduit having a rectangular circumference as is customary for portable grill frame members. The conduit has a first end portion mounted to a horizontally disposed hollow frame member of an outdoor gas grill, such as an arm supporting a side platform of the grill. The conduit further includes a second end portion parallel to and spaced apart from the first end portion by an intermediate portion extending upwardly therebetween.

An illumination assembly is pivotally coupled to the second end portion such that it can be positioned to illuminate the cooking grate of the grill or an area adjacent to the grill. A hose having first and second ends extends through the hollow interior of the intermediate and second end portions of the conduit. The first end of the hose may be connected to a container of combustible fuel, such as propane gas, that is also used to fuel the cooking means of the grill. The second end of the hose is coupled to the illumination assembly for supplying fuel thereto. The illumination assembly further includes a mantle and igniter for selectably providing light during operation thereof.

Therefore, it is a general object of this invention to provide a lighting apparatus which can be used with a gas grill for illuminating food cooking on a cooking grate thereof.

Another object of this invention is to provide a lighting apparatus, as aforesaid, which is easy to install on new and existing portable gas grills.

Still another object of this invention is to provide a lighting apparatus, as aforesaid, which is economical to manufacture.

Yet another object of this invention is to provide a lighting apparatus, as aforesaid, which includes an illumination assembly operated with the same combustible fuel used to operate the grill.

A further object of this invention is to provide a lighting apparatus, as aforesaid, in which the illumination assembly is pivotal so as to direct light upon the cooking grate or an area adjacent the grill.

A still further object of this invention is to provide a lighting apparatus, as aforesaid, in which the illumination assembly may be operated from the main control panel of the grill.

Other objects and advantages of this invention will become apparent from the following description taken in connection with the accompanying drawings, wherein is set forth by way of illustration and example, an embodiment of this invention.

BRIEF SUMMARY OF THE DRAWINGS

FIG. 4b is an exploded view of the conduit mounting assembly as in FIG. 4a;

FIG. 5b is an exploded view of the conduit mounting assembly as in FIG. 5a.

DESCRIPTION OF THE PREFERRED EMBODIMENT

Figure 1:
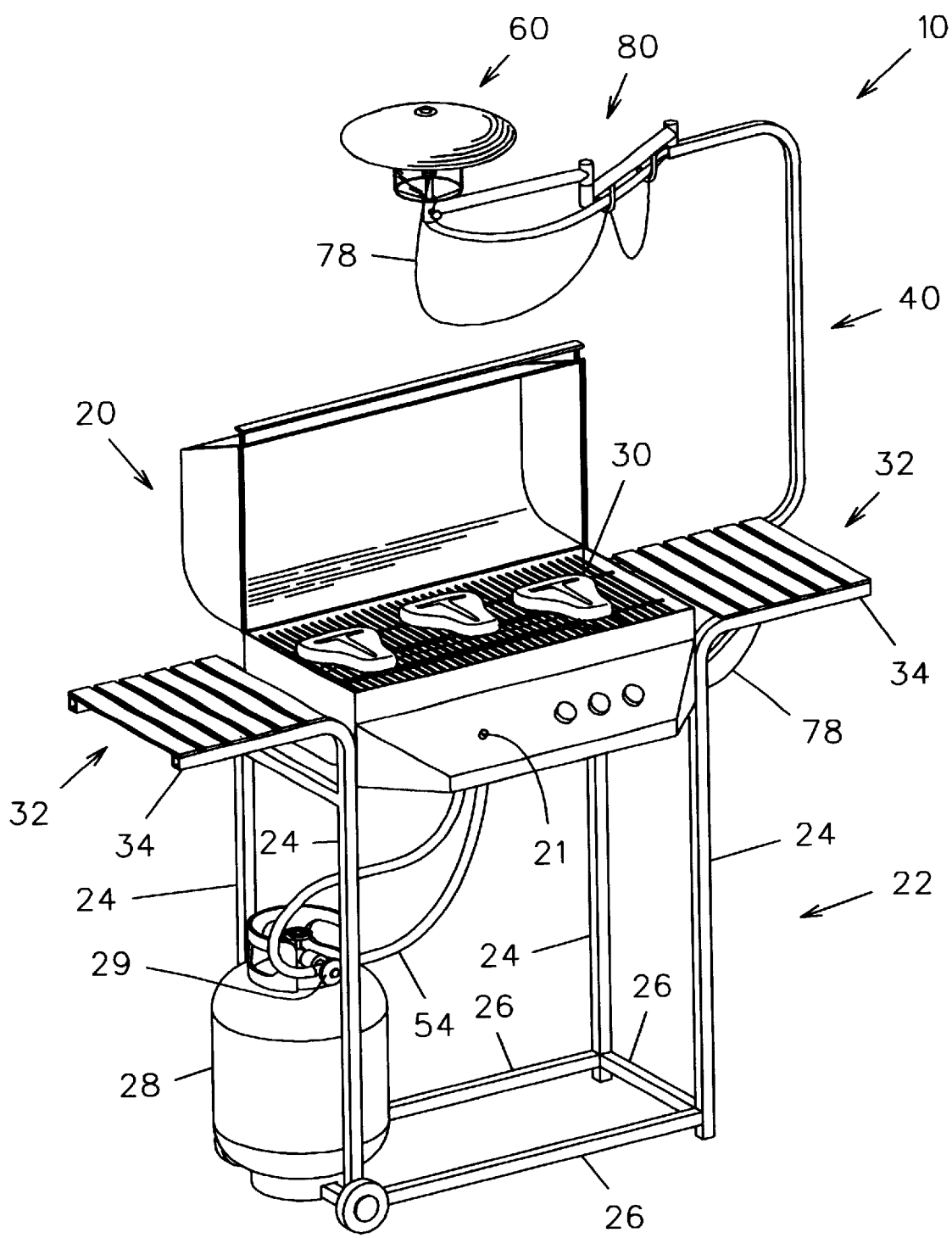
FIG. 1 is a perspective view of the grill lighting apparatus according to a preferred embodiment of the invention.
Figure 2:
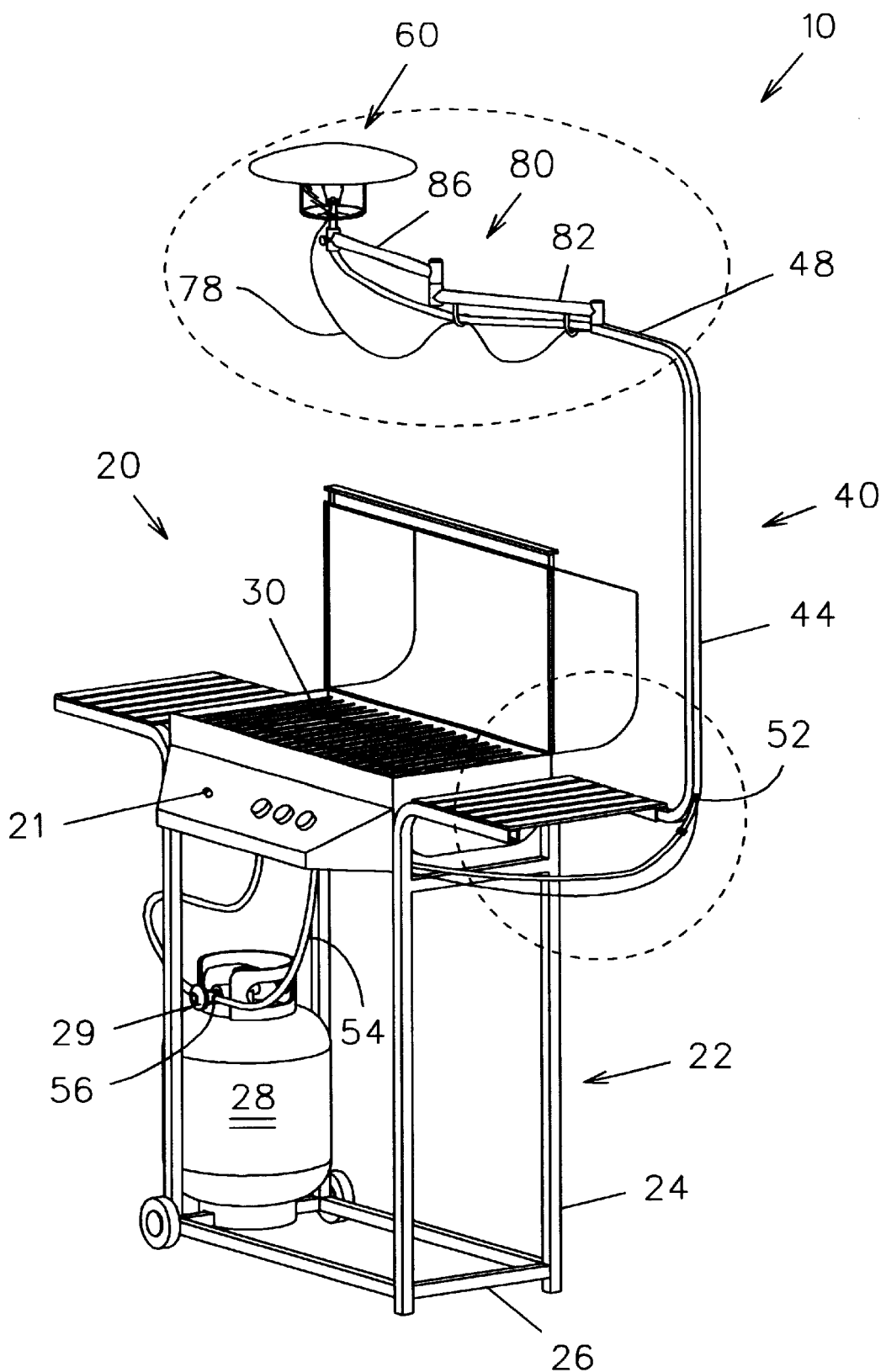
FIG. 2 is another perspective view of the apparatus as in FIG. 1.

The preferred embodiment of the grill lighting device will now be described with reference to FIGS. 1–4b of the accompanying drawings. The lighting apparatus 10 is particularly constructed to be used in conjunction with a conventional portable outdoor gas grill 20 having a frame assembly 22 (FIGS. 1 and 2). The frame assembly 22 includes a plurality of legs 24 with cross-struts 26 therebetween and a combustible fuel container 28 mounted thereto. The fuel container 28 contains propane or other suitable gas. A cooking grate 30 is supported atop the legs 24 and at least one side platform 32 is mounted atop horizontal support arms 34 with fasteners 36 such as bolt/nut combinations. The support legs 24 and arms 34 conventionally found on portable grills present a rectangular circumference although grills with tubular support members can also be used with this invention.

Figure 4A:
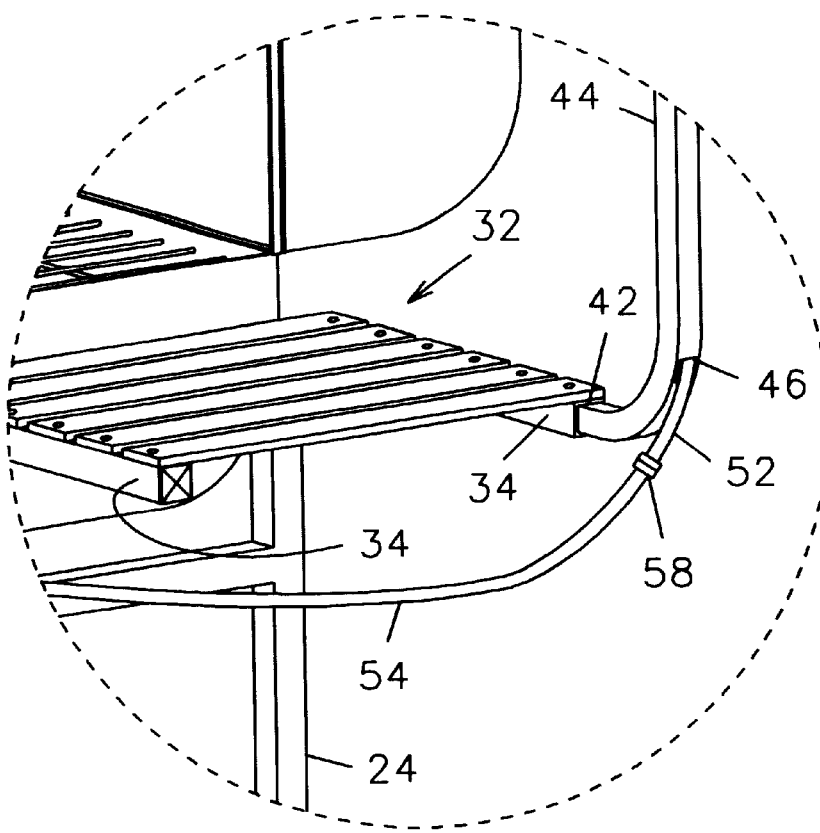
FIG. 4a is an isolated perspective view on an enlarged scale of the conduit mounted to a gas grill as in FIG. 2.
Figure 4B:
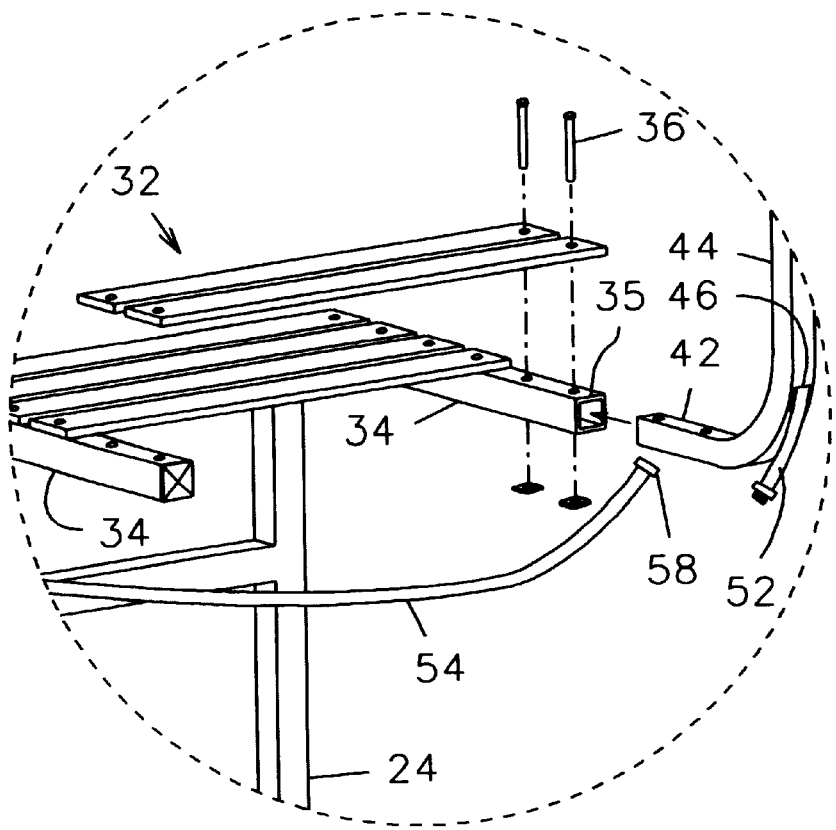
Figure 5A:
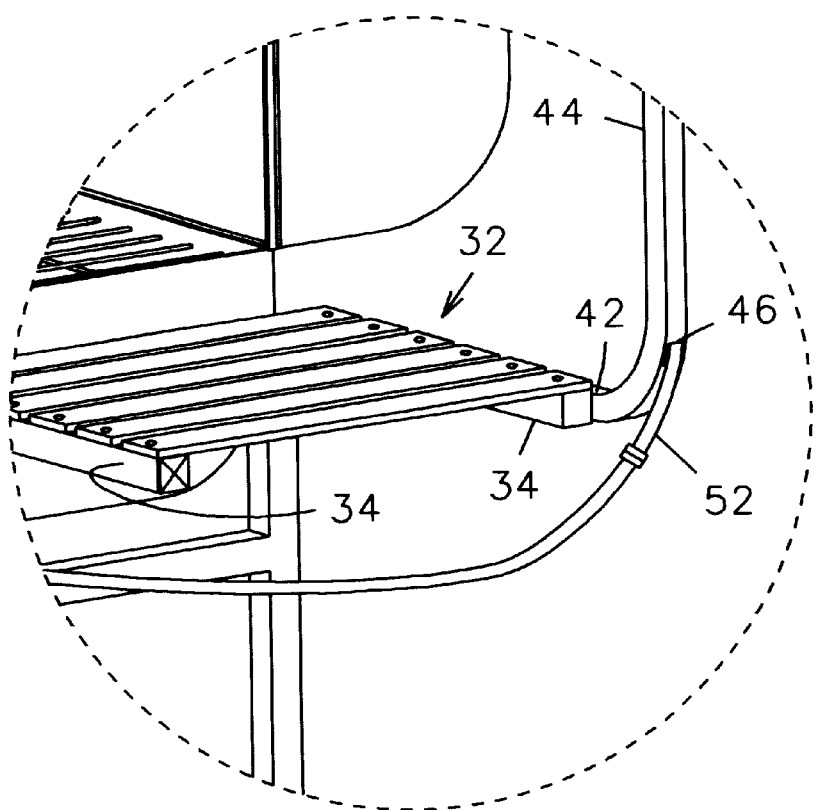
FIG. 5a is an isolated perspective view on an enlarged scale of an alternative embodiment of the conduit mounted to a gas grill as in FIG. 2.
Figure 5B:
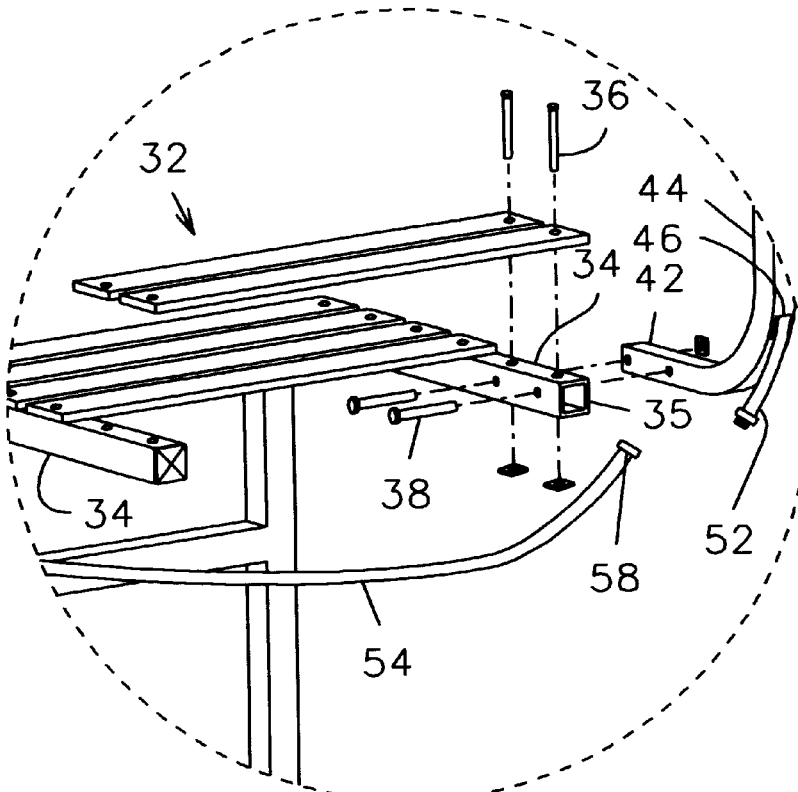

The lighting apparatus 10 includes an elongate conduit 40 having a peripherally rectangular circumference of the type that is conventional for the construction of outdoor cooking grills. It is understood, however, that the conduit 40 may be constructed of tubular conduit where it is to be used with a grill having tubular frame members. As best shown in FIGS. 4a and 4b, the lighting apparatus 10 includes a first end portion 42 having a peripheral circumference smaller than a circumference of a horizontal support arm 34 such that the first end portion 42 may be slidably received within the support arm 34 through an opening 35 in the end thereof and secured thereto with fasteners 36 such as bolt/nut combinations. Alternatively, the first end portion 42 may be mounted to a side of the support arm 34 with laterally extending fasteners 38 such as bolt/nut combinations (FIGS. 5a and 5b).

The conduit 40 includes an intermediate portion 44 extending upwardly and normal to the first end portion 42.

A second end portion 48 is normal to the intermediate portion 44 and parallel to the first end portion 42. The lower end of the intermediate portion 44 includes an aperture 46. A primary segment 52 of an elongate flexible hose extends through the aperture 46 and through the intermediate 44 and second 48 conduit portions, the primary segment 52 exiting and extending beyond an open distal end 50 of the second end portion 48 of the conduit 40. An auxiliary segment 54 of the hose includes a first end 56 coupled to a valve 29 on the grill fuel container 28 and a second end 58 coupled to a lower end of the primary segment 52.

Figure 3:
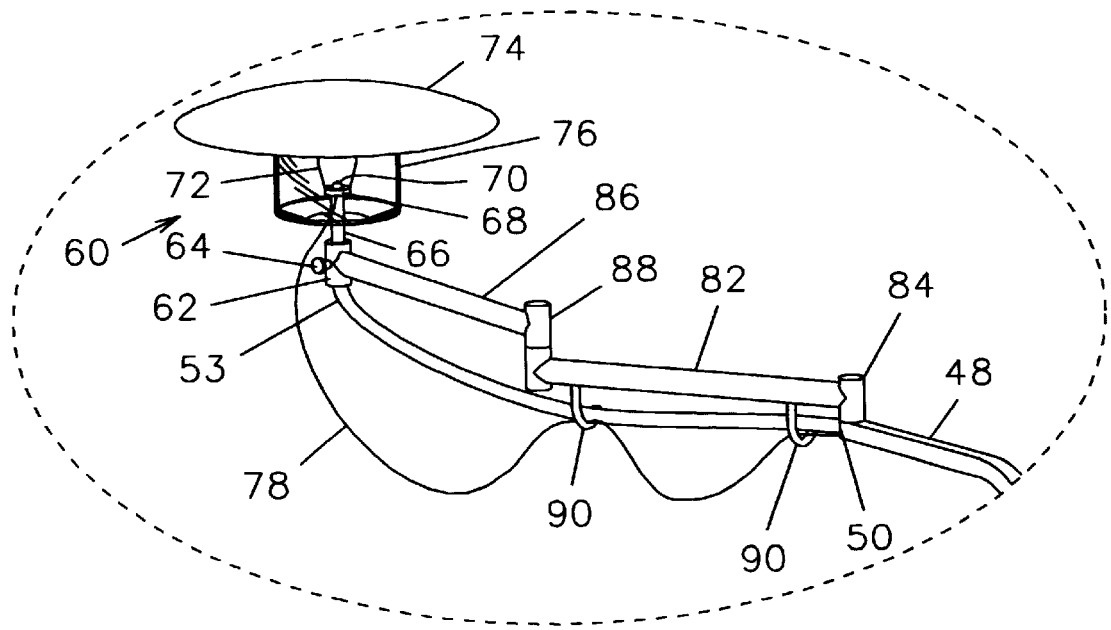
FIG. 3 is an isolated perspective view on an enlarged scale of the illumination assembly and swivel arm assembly of the apparatus as in FIG. 2.

As best shown in FIG. 3, the lighting apparatus 10 further includes an illumination assembly 60 pivotally coupled to the free end 50 of the second end portion 48 of the conduit 40 with a swivel assembly 80. The swivel assembly 80 includes a first arm 82 having a first end pivotally coupled to the free end 50 of the second end portion 48 of the conduit 40 with a hinge 84. The swivel assembly 80 further includes a second arm 86 having a first end pivotally coupled to a second end of the first arm 82 with a hinge 88. A pair of hooks 90 depend from the first arm 82 for supporting and guiding a portion of the primary segment 52 of the hose.

The illumination assembly 60 includes a valve 62 mounted to a second end of the second arm 86 of the swivel assembly 80. The upper end 53 of the primary segment 52 of the hose is coupled to the valve 62, the valve including a regulatory knob 64 for controlling the rate of gas flow therethrough. A supply conduit 66 extends from the valve 62 and includes a burner 68 at a terminal end thereof, the burner 68 having an igniter 70 capable of providing a spark to ignite gas flowing from the supply conduit 66. A bag-like mantle 72 is supported above the burner 68 and is constructed of a fabric which is effective to provide light when in close proximity to a flame. The illumination assembly 60 further includes a reflector 74 having a transparent shield 76 or globe depending concentrically therefrom and surrounding the mantle 72.

In use, the lighting apparatus 10 may be mounted to a gas grill 20 at the point of manufacture or by a user to a preexisting grill. The apparatus 10 is mounted by sliding the first end portion 42 into the open end 35 of a horizontal support arm 34 of a gas grill 20 and securing it thereto with the bolt/nut fasteners 36 that are provided to hold a side platform 32 to the arm 34 (FIG. 4b). Alternatively, the first end portion 42 is mounted to a side of the support arm 34 by inserting fasteners 38 laterally through the arm 34 and first end portion 42 (FIG. 5b). The primary segment 52 of the hose is then coupled to the auxiliary segment 54. The auxiliary segment 54 is coupled to a special valve 29 which, in turn, is coupled to the combustible fuel container 28 (e.g. propane tank) such that gas may be regulated to both the cooking mechanism of the grill and to the illumination assembly.

The illumination assembly 60 may be positioned so as to direct light upon the cooking grate 30 or to another area by pivoting the swivel assembly 80. The flow of gas through the supply conduit 66 and into the area within the mantle 72 may be regulated by the valve knob 64. The gas may be ignited by a user pressing a button 21 on the main grill panel area which delivers a voltage through a wire 78 to an igniter 70 on the illumination assembly burner 68.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. A grill lighting apparatus, comprising:
   a hollow conduit having a first end and a second end, said first end adapted to be mounted in an adjacent relationship relative to a hollow frame member of a gas grill having a cooking grate;
   means coupled to said second end of said conduit for illuminating the cooking grate on the grill; and
   a flexible tube having a first end adapted to be coupled to a combustible fuel container, said tube extending through said conduit and having a second end coupled to said illuminating means for delivery of combustible fuel thereto.

2. The grill lighting apparatus as in claim 1 further comprising a swivel arm assembly having a first end pivotally coupled to said second end of said conduit and a second end fixedly attached to said illuminating means.

3. The grill lighting apparatus as in claim 1 further comprising:
   a first arm having first and second ends, said first end of said first arm pivotally coupled to said second end of said conduit;
   a second arm having first and second ends, said first end of said second arm pivotally coupled to said second end of said first arm and said second end of said second arm fixedly attached to said illuminating means.

4. The grill lighting apparatus as in claim 3 further comprising a pair of spaced apart hooks depending from said first arm for directing a portion of said flexible tube.

5. The grill lighting apparatus as in claim 1 wherein said illuminating means includes:
   a reflector;
   a transparent shield concentric within said reflector;
   a bag-like mantle mounted within said shield and being constructed of a fabric which is effective to provide light when in close proximity to a flame;
   a supply conduit adapted to supply combustible fuel to said mantle, said supply conduit including at a terminal end thereof a burner adapted to ignite the fuel flowing through said supply conduit; and
   a valve coupling said second end of said flexible tube with said supply conduit for selectably controlling the flow of fuel through said supply conduit.

6. An apparatus for illuminating a gas grill, comprising:
   an elongate hollow rectangular conduit comprising:
      a first portion adapted to be mounted to a frame member underlying a side platform of the grill;
      a second portion parallel to said first portion;
      a third portion intermediate said first and second portions and extending therebetween;
   means for illuminating pivotally coupled to said second portion of said conduit such that said illuminating means may be aimed directly at a cooking grate on the grill or at an area adjacent the grill; and
   a hose having a first end adapted to be coupled to a combustible fuel container, said tube extending through said conduit and having a second end coupled to said illuminating means.

7. The apparatus as in claim 6 wherein a circumference of said first portion of said conduit is smaller than a circumference of the frame member of the grill such that said first portion may be mounted to the frame member in a sliding fit relationship.

8. The apparatus as in claim 6 further comprising means for mounting said first portion of said conduit to a side of the frame member of the grill.

9. The apparatus as in claim 6 further comprising a swivel arm assembly having a first end pivotally coupled to said second portion of said conduit and a second end coupled to said illuminating means.

10. The apparatus as in claim 6, further comprising:
   a first arm having first and second ends, said first end of said first arm pivotally coupled to said second portion of said conduit; and
   a second arm having first and second ends, said first end of said second arm pivotally coupled to said second end of said first arm and said second end of said second arm fixedly attached to said illuminating means.

11. The apparatus as in claim 10 further comprising a pair of spaced apart hooks depending from said first arm for directing said hose along said first arm.

12. The apparatus as in claim 6 wherein said illuminating means includes:
   a reflector;
   a transparent shield concentric within said reflector;
   a bag-like mantle mounted within said shield and being constructed of a fabric which is effective to provide light when in close proximity to a flame;
   a supply conduit adapted to supply combustible fuel to said mantle, said supply conduit including at the terminal end thereof a burner adapted to ignite the fuel flowing through said supply conduit; and
   a valve coupling said second end of said hose with said supply conduit for selectably controlling the flow of gas through said supply conduit.

13. A grill lighting apparatus, comprising:
   a gas grill comprising:
      a framework having a plurality of vertical support legs with cross-struts extending therebetween;
      a cooking grate mounted atop said legs;
      a pair of hollow horizontal support arms normal to a corresponding pair of said legs and extending outwardly therefrom for supporting a side platform thereon;
      a combustible fuel storage tank positioned on said framework;
      means for delivering fuel from said tank to said cooking grate;
   a hollow rectangular conduit having a first end mounted to one of said support arms of said grill, and a second end displaced above said cooking grate of said grill;
   means coupled to said second end of said conduit for illuminating said cooking grate; and
   a hose having a first end coupled to said fuel storage tank and extending through said conduit and having a second end coupled to said illuminating means, whereby combustible fuel is selectably conveyed from said tank to said illuminating means.

14. The grill lighting apparatus as in claim 13 wherein a circumference of said first end of said conduit is smaller that a circumference of said one support arm such that said first end is mounted within said one support arm.

15. The grill lighting apparatus as in claim 13 wherein said first end of said conduit is fixedly mounted to a side of said one support arm.

16. The grill lighting apparatus as in claim 13 further comprising a swivel arm assembly having a first end pivotally coupled to said second end of said conduit and a second end coupled to said illuminating means.

17. The grill lighting apparatus as in claim 13 further comprising:
   a first arm having first and second ends, said first end of said first arm pivotally coupled to said second end of said conduit; and
   a second arm having first and second ends, said first end of said second arm pivotally coupled to said second end of said first arm and said second end of said second arm fixedly attached to said illuminating means.

18. The grill lighting apparatus as in claim 13 wherein said illuminating means includes:
   a reflector;
   a transparent shield concentric within said reflector;
   a bag-like mantle mounted within said shield and being constructed of a fabric which is effective to provide light when in close proximity to a flame;
   a supply conduit adapted to supply combustible fuel to said mantle, said supply conduit including at the terminal end thereof a burner adapted to ignite the fuel flowing through said supply conduit; and
   a valve coupling said second end of said hose with said supply conduit for selectably controlling the flow of gas through said supply conduit.

\* \* \* \* \*